United States Patent
Hu

(10) Patent No.: US 9,832,289 B2
(45) Date of Patent: Nov. 28, 2017

(54) METHOD AND NETWORK DEVICE FOR DATA PROCESSING

(71) Applicants: AMBIT MICROSYSTEMS (SHANGHAI) LTD., Shanghai (CN); HON HAI PRECISION INDUSTRY CO., LTD., New Taipei (TW)

(72) Inventor: Jyh-Ding Hu, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 67 days.

(21) Appl. No.: 14/863,840

(22) Filed: Sep. 24, 2015

(65) Prior Publication Data

US 2016/0100040 A1    Apr. 7, 2016

(30) Foreign Application Priority Data

Oct. 7, 2014   (TW) .............................. 103134949 A

(51) Int. Cl.
*H04L 29/06*    (2006.01)

(52) U.S. Cl.
CPC ................................. *H04L 69/161* (2013.01)

(58) Field of Classification Search
None
See application file for complete search history.

(56) References Cited

U.S. PATENT DOCUMENTS

| 6,405,236 B1* | 6/2002 | Nieratschker | H04L 29/06 709/200 |
|---|---|---|---|
| 2006/0268820 A1 | 11/2006 | Mahkonen et al. | |
| 2009/0034416 A1* | 2/2009 | Baron | H04L 12/4633 370/235 |
| 2011/0004932 A1* | 1/2011 | Spatscheck | H04L 63/0236 726/13 |
| 2013/0259045 A1 | 10/2013 | Johansson et al. | |

FOREIGN PATENT DOCUMENTS

TW    200807969 A    2/2008

* cited by examiner

*Primary Examiner* — Hicham Foud
(74) *Attorney, Agent, or Firm* — ScienBiziP, P.C.

(57) ABSTRACT

A method for data processing is executable by a network device. The network device is configured to forward a packet in a network to another network. Before forwarding the packet to the other network, the network device adds corresponding destination information address and transport layer protocol information into a header of the packet. The packet will be fast forwarded in subsequent networks or network devices, thereby saving forwarding time and improving forwarding efficiency.

12 Claims, 5 Drawing Sheets

METHOD AND NETWORK DEVICE FOR DATA PROCESSING

FIELD

The subject matter herein generally relates to network communication technology, and particularly to a method and a network device for data processing.

BACKGROUND

With the development of the size of the internet, more and different network structures have been appearing. So processing packets by a network device in a network is necessary when a host computer in the network visits another network. For example, before forwarding a packet in a first network to a second network, forward-related information is necessary to package the packet, to obtain a packaged packet which contains forward-related information, then the packaged packet is forwarded to the second network. When the second network receives and forwards the packaged packet, the packaged packet is processed with filtering, routing, firewall testing, tracking and so on.

BRIEF DESCRIPTION OF THE DRAWINGS

Implementations of the present technology will now be described, by way of example only, with reference to the attached figures, wherein.

DETAILED DESCRIPTION

Figure 1:
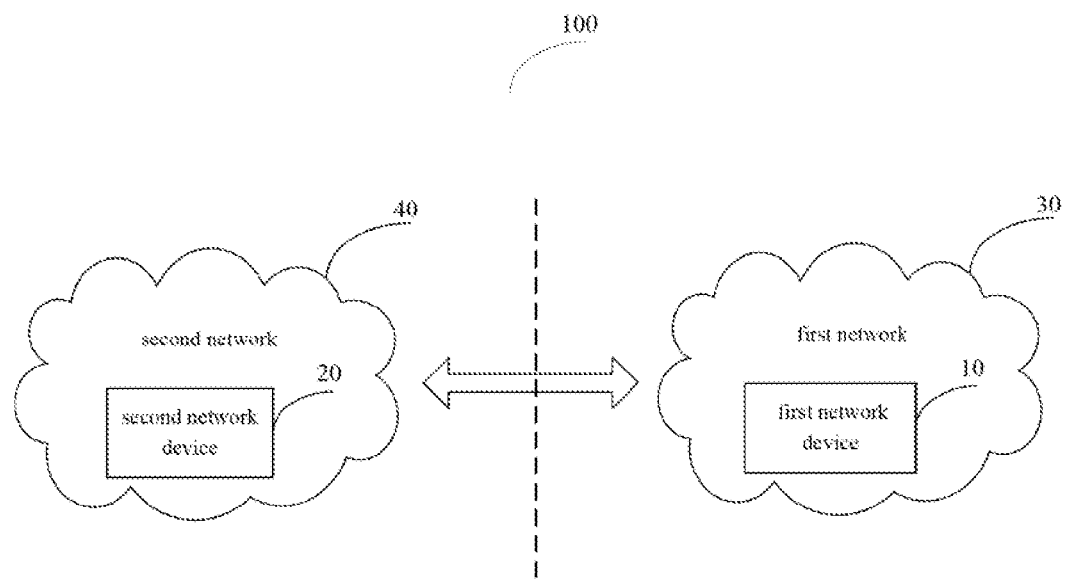
FIG. 1 illustrates a diagrammatic view of an operating environment of one embodiment of a network device, in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Embodiments of a network device and a method for processing packet, are detailed in the following description.

FIG. 1 illustrates an operating environment of one embodiment of a network device. In the illustrated embodiment, a network system 100 comprises a first network device 10 located in a first network 30 and a second network device 20 located in a second network 40. The first network 30 and the second network 40 are respectively configured to use different internet communication protocols. In an embodiment, the first network 30 may be configured to use internet protocol version 4 (IPv4), and the second network 40 may be configured to use internet protocol version 6 (IPv6). In other embodiments, the first network 30 also may be configured to use IPv6, the second network 40 may be configured to use IPv4. The first network device 10 forwards a packet in the first network 30 to the second network 40, receives and forwards a packet which is sent from the second network 40 and transmitted by the second network device 20. The second network device 20 receives a packet which is sent from the first network 30 and forwards the packet to a corresponding destination address, and forwards a packet in the second network 40 to the first network 30. In the illustrated embodiment, the first network device 10 and the second network device 20 can be one of various network devices which can forward packets, for example, routers, switches, gateways, bridges, hot spots, access points and so on.

An example, of forwarding a packet in the first network device 10 to the second network device 20 is given to explain functions of the first network device 10 and the second network device 20 in the following description.

Figure 2:
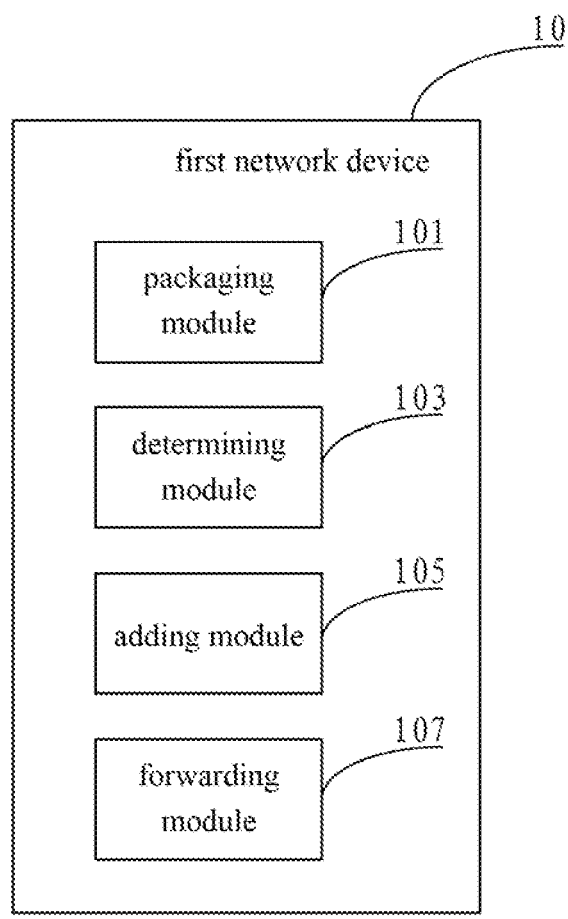
FIG. 2 is a block diagram of a network device according to one embodiment of the disclosure.

FIG. 2 is a block diagram of a network device according to one embodiment of the disclosure. In the illustrated embodiment, the first network device 10 is configured to receive a packet in the first network 30, and forward the packet to the second network device 20 in the second network 40. The first network device 10 comprises a packaging module 101, a determining module 103, an adding module 105, and a forwarding module 107.

In the illustrated embodiment, when other devices in the first network 30 are required to communicate with the second network 40, sending a first packet to be forwarded to the first network device 10 is necessary. A header of the first packet to be forwarded comprises first network information of the first network 30, and the first packet to be forwarded is received by the first network device 10.

The packaging module 101 packages second network information of the second network 40 into the first packet to be forwarded, to obtain a second packet. In the illustrated embodiment, because the first packet is to be sent to the second network 40, the first network device 10 further obtains the second network information of the second network 40, and packages the obtained second network information into the header of the first packet to be forwarded, to obtain the second packet.

The determining module 103 determines if there is transport layer protocol information in the second packet. The transport layer protocol information comprises user datagram protocol (UDP) information or transmission control protocol (TCP) information. In the illustrated embodiment, the determining module 103 determines whether the transport layer protocol information is in the second packet according to the format type of the second packet. However, the illustrated embodiment is merely an example and is not intended to be limiting, the determining module 103 also can determine the transport layer protocol information in other ways.

Figure 3:
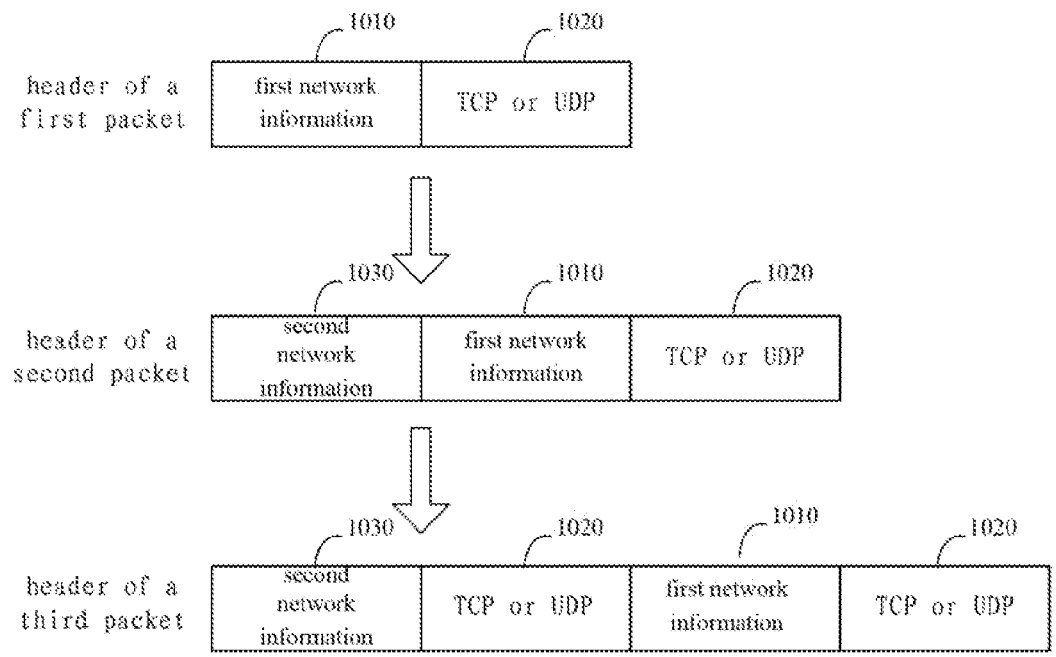
FIG. 3 is a diagrammatic view of processing packet by a network device according to one embodiment of the disclosure.
Figure 4:
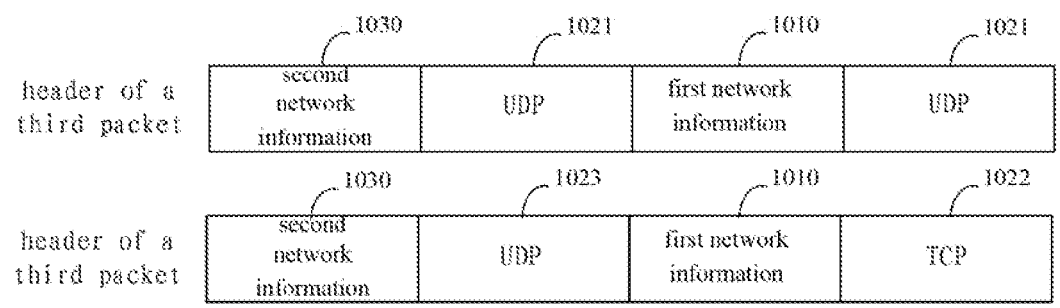
FIG. 4 is a diagrammatic view of processing packet by a adding module, in accordance with one embodiment of the disclosure.

The adding module 105 adds transport layer protocol information into a header of the second packet when there is transport layer protocol information in the second packet, to obtain a third packet. In the illustrated embodiment, when the determining module 103 determines that the transport layer protocol information is in the second packet, the adding module 105 further adds the transport layer protocol information into the header of the second packet. In an embodiment, the transport layer protocol information is configured between the first network information and the second network information in the header of the second packet. FIGS. 3-4 illustrate detail in the following description.

FIG. 3 illustrates a diagrammatic view of one embodiment of processing packet by the first network device 10. In the illustrated embodiment, the first network device 10 receives the first packet to be forwarded, wherein the header of the first packet comprises first network information 1010 of the first network 30. The packaging module 101 further packages the second network information 1030 of the second network 40 into the header of the first packet, to obtain the second packet. When the second packet comprises UDP information or TCP information 1020, the adding module 105 adds the UDP information or TCP information 1020 into the header of the second packet, to obtain the third packet, the UDP information or the TCP information 1020 is configured between the first network information 1010 and the second network information 1030.

FIG. 4 illustrates a diagrammatic view of another method of processing packet by the adding module 105. In the illustrated embodiment, when there is UDP information 1021 in the second packet, the adding module 105 adds the UDP information 1021 into the header of the second packet between the first network information 1010 and the second network information 1030, to obtain the third packet. When there is TCP information 1022 in the second packet, the adding module 105 generates UDP information 1023, and adds the generated UDP information 1023 into the header of the second packet between the first network information 1010 and the second network information 1030, to obtain the third packet. Since a size of a packet which UDP occupies is smaller than that of a packet which TCP occupies, the processing time of the adding module 105 is further reduced.

The forwarding module 107 forwards the third packet to the second network 40. In the illustrated embodiment, after processing the first packet with the packaging module 101 and the adding module 105, the first network device 10 obtains the third packet, the forwarding module 107 forwards the third packet to the second network device 20 in the second network 40 according to address information of the third packet.

In the illustrated embodiment, the second network device 20 determines whether there is the transport layer protocol information in the third packet after receiving the third packet. When the transport layer protocol information is in the third packet, the second network device 20 executes fast-forwarding. When there is no transport layer protocol information in the third packet, the second network device 20 executes normal-forwarding. Here, the term "fast-forwarding" means that the third packet is forwarded directly, and not processed with filtering, routing, firewall testing, tracking and so on, the term "normal-forwarding" means that the third packet is forwarded after being processed with filtering, routing, firewall testing, tracking and so on. So, before forwarding a packet in the first network 30 to the second network 40, the first network device 10 not only packages corresponding information of the second network 40 into the packet but also executes further processes, to obtain a further-processed packet; then the first network device 10 sends the further-processed packet to the second network device 20; the second network device 20 receives the further-processed packet and fast forwards it to one or more terminal equipment (e.g., smart phone, computer, server). Because the further-processed packet is fast forwarded by the second network device 20, the forwarding efficiency is further improved.

In the illustrated embodiment, the structure of each network device is explained by the example of the first network device 10 for forwarding a packet to other networks and the second network device 20 for forwarding a packet which is from other networks, but is not limit to the disclosure. A network device also can comprise all functions as described above, namely in a single network device may comprise both functions of the first network device 10 and functions of the second network device 20, to achieve complete functions that can forward a packet to other networks and can forward a packet which is from other networks.

In the embodiment illustrated above, the first network device 10 can process packets, for example, adding corresponding destination address information and transport layer protocol information into each of the packets, to achieve fast-forwarding of the processed packet in subsequent processing procedures, thereby saving forwarding time and improving forwarding efficiency.

Figure 5:
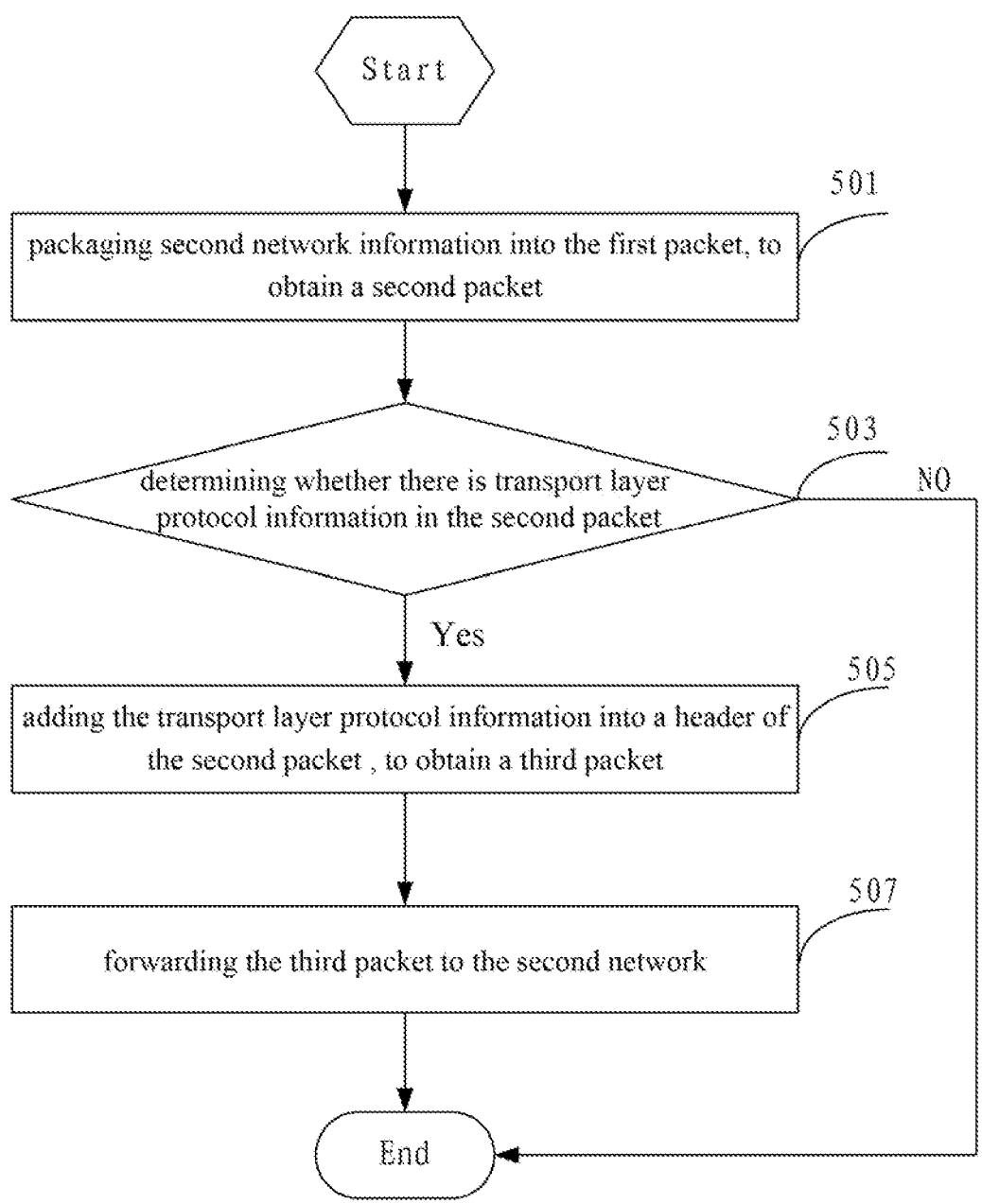
FIG. 5 is a flowchart of a method for processing packet according to one embodiment of the disclosure.

FIG. 5 illustrates a flowchart of one embodiment of a method for processing packets. The method is used to forward a first packet in a first network to a second network by a first network device located in a first network and a second network device located in a second network. The first network device may comprise a packaging module, a determining module, an adding module, and a forwarding module, and a header of the first packet comprises first network information.

At block 501, the first network device packages second network information into the first packet, to obtain a second packet. In the illustrated embodiment, the first network device packages a destination address information of the second network into the first packet to be forwarded. Because the first packet will be forwarded to the second network, the first network device further obtains the second network information (the destination address) of the second network, and packages the obtained second network information into the header of the first packet, to obtain the second packet.

At block 503, the first network device determines whether the transport layer protocol information is in the second packet. Transport layer protocol information comprises user datagram protocol (UDP) information or transmission control protocol (TCP) information. In the illustrated embodiment, the first network device determines whether there is transport layer protocol information in the second packet accordance to the format type of the second packet. However, the illustrated embodiment is merely an example and is not intended to be limiting. When the transport layer protocol information is in the second packet, the process goes to block 505. When there is no transport layer protocol information in the second packet, the process ends.

At block 505, the first network device adds the transport layer protocol information into a header of the second packet, to obtain a third packet. In the illustrated embodiment, when the first network device determines that the transport layer protocol information is in the second packet, the first network device further adds the transport layer protocol information into the header of the second packet. In one embodiment, the transport layer protocol information is configured between the first network information and the second network information of the header of the second packet.

In other embodiments, when there is UDP information in the second packet, the first network device adds the UDP information into the header of the second packet between the first network information and the second network information, obtaining the third packet. When there is TCP information in the second packet, the first network device generates UDP information, and adds the generated UDP information into the header of the second packet between the first network information and the second network information, to obtain the third packet. Since a size of a packet which UDP occupies is smaller than that of a packet which TCP occupies, the processing time is further reduced.

At block 507, the first network device 10 forwards the third packet to the second network. In the illustrated embodiment, after processing the first packet, the first network device 10 obtains the third packet, the first network device 10 forwards the third packet to the second network device in the second network according to the address information of the third packet.

In the embodiment as illustrated above, the first network device can process packets, for example, adding corresponding destination address information and transport layer protocol information into each of the packets, to achieve that the processed packet is fast forwarded in subsequent processing procedures, thereby saving forwarding time and improving forwarding efficiency.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A network device located in a first network for forwarding a first packet in the first network to a second network, a header of the first packet comprising first network information, the device comprising:
    at least one processor;
    a non-transitory storage medium coupled to the at least one processor and configured to store one or more programs that are executed by the at least one processor, the one or more programs including instructions for:
        packaging, to obtain a second packet, second network information into the first packet;
        determining whether there is transport layer protocol information in the second packet;
        copying and inserting the transport layer protocol information into the header of the second packet to obtain a third packet when the transport layer protocol information is in the second packet, wherein the inserted transport layer protocol information is located between the second network information and the first network information and is used as a fast-forwarding identification; and
        forwarding the third packet to the second network which fast-forwards the third packet upon the condition that there is the inserted transport layer protocol information in the header of the third packet.

2. The network device of claim 1, wherein the transport layer protocol information comprises user datagram protocol (UDP) information or transmission control protocol (TCP) information, the one or more programs further including instructions for:
    copying and inserting the UDP information into the header of the second packet; and
    generating the UDP information, and inserting the generated UDP information into the header of the second packet when the TCP information is in the second packet.

3. The network device of claim 2, wherein the UDP information is configured between the first network information and the second network information when the UDP information is in the second packet.

4. The network device of claim 2, wherein the UDP information is configured between the first network information and the second network information when the TCP information is in the second packet.

5. A method for data processing operable to be executed in a network device, the network device is located in a first network for forwarding a first packet in the first network to a second network, a header of the first packet comprising first network information, the method comprising:
    packaging, to obtain a second packet, second network information into the first packet;
    determining whether there is transport layer protocol information in the second packet;
    copying and inserting the transport layer protocol information into the header of the second packet to obtain a third packet when the transport layer protocol information is in the second packet, wherein the inserted transport layer protocol information is located between the second network information and the first network information and is used as a fast-forwarding identification; and
    forwarding the third packet to the second network which fast-forwards the third packet upon the condition that there is the inserted transport layer protocol information in the header of the third packet.

6. The method of claim 5, wherein the transport layer protocol information comprises user datagram protocol (UDP) information or transmission control protocol (TCP) information, and the method further comprises:
    copying the UDP information into the header of the second packet; and generating the UDP information, and inserting the generated UDP information into the header of the second packet when the TCP information is in the second packet.

7. The method of claim 6, wherein the UDP information is configured between the first network information and the second network information when the UDP information is in the second packet.

8. The method of claim 6, wherein the UDP information is configured between the first network information and the second network information when the TCP information is in the second packet.

9. A non-transitory storage medium configured to store one or more programs:
   when a first packet is forwarded from a first network to a second network, a header of the first packet comprising first network information, the one or more programs cause a network device to:
   package, to obtain a second packet, second network information into the first packet;
   determine whether there is transport layer protocol information in the second packet;
   copy and insert the transport layer protocol information into the header of the second packet to obtain a third packet when the transport layer protocol information is in the second packet, wherein the inserted transport layer protocol information is located between the second network information and the first network information and is used as a fast-forwarding identification; and
   forward the third packet to the second network which fast-forwards the third packet upon the condition that there is the inserted transport layer protocol information in the header of the third packet.

10. The non-transitory storage medium of claim 9, wherein the transport layer protocol information comprises user datagram protocol (UDP) information or transmission control protocol (TCP) information, the one or more programs further cause the network device to:
    copy the UDP information into the header of the second packet, when the UDP information is in the second packet; and
    generate the UDP information, and insert the UDP information into the header of the second packet when the TCP information is in the second packet.

11. The non-transitory storage medium of claim 10, wherein the UDP information is configured between the first network information and the second network information when the UDP information is in the second packet.

12. The non-transitory storage medium of claim 10, wherein the UDP information is configured between the first network information and the second network information when the TCP information is in the second packet.

* * * * *